United States Patent [19]
Elmore

[11] 4,079,434
[45] Mar. 14, 1978

[54] OUT-OF-STEP RELAY

[75] Inventor: Walter A. Elmore, Millington, N.J.

[73] Assignee: Westinghouse Electric Corporation, Pittsburgh, Pa.

[21] Appl. No.: 707,989

[22] Filed: Jul. 23, 1976

Related U.S. Application Data

[63] Continuation of Ser. No. 577,515, May 14, 1975, abandoned.

[51] Int. Cl.² .............................................. H02H 3/28
[52] U.S. Cl. ........................................ 361/79; 361/85
[58] Field of Search ..................... 361/81, 85, 79, 62, 361/65, 66; 235/151.31; 307/232; 324/83 D, 83 R; 340/253 Y

[56] References Cited

U.S. PATENT DOCUMENTS

| | | | |
|---|---|---|---|
| 3,277,345 | 10/1966 | Waldron | 317/27 R X |
| 3,379,935 | 4/1968 | Hoel et al. | 317/27 R X |
| 3,519,884 | 7/1970 | Paddison et al. | 317/27 R |
| 3,523,213 | 8/1970 | Sonnemann | 317/27 R |
| 3,599,044 | 8/1971 | Takemura et al. | 317/27 R X |
| 3,731,152 | 5/1973 | Rockefeller, Jr. | 317/27 R |
| 3,885,199 | 5/1975 | Nohara et al. | 317/27 R |
| 3,898,530 | 8/1975 | Perez-Cavero | 317/27 R |

*Primary Examiner*—J D Miller
*Assistant Examiner*—Patrick R. Salce
*Attorney, Agent, or Firm*—D. R. Lackey

[57] ABSTRACT

An out-of-step relay for an alternating potential electric power transmission line is disclosed wherein the decision to trip is determined by the rate of change of the phase relationship of the voltages at the remote and local ends of the transmission line as well as by the magnitude of the phase difference of the remote and local voltages. More particularly, there is described a pair of AND networks which provide two timing signals proportional to the phase difference of the voltages and a pair of timing devices; one of said devices timing the difference in the time of the two timing signals to establish the rate of change of the phase relationship and the other of said devices timing the sum of the two timing signals to establish a signal which is representative of the magnitude of the phase relationship.

15 Claims, 3 Drawing Figures

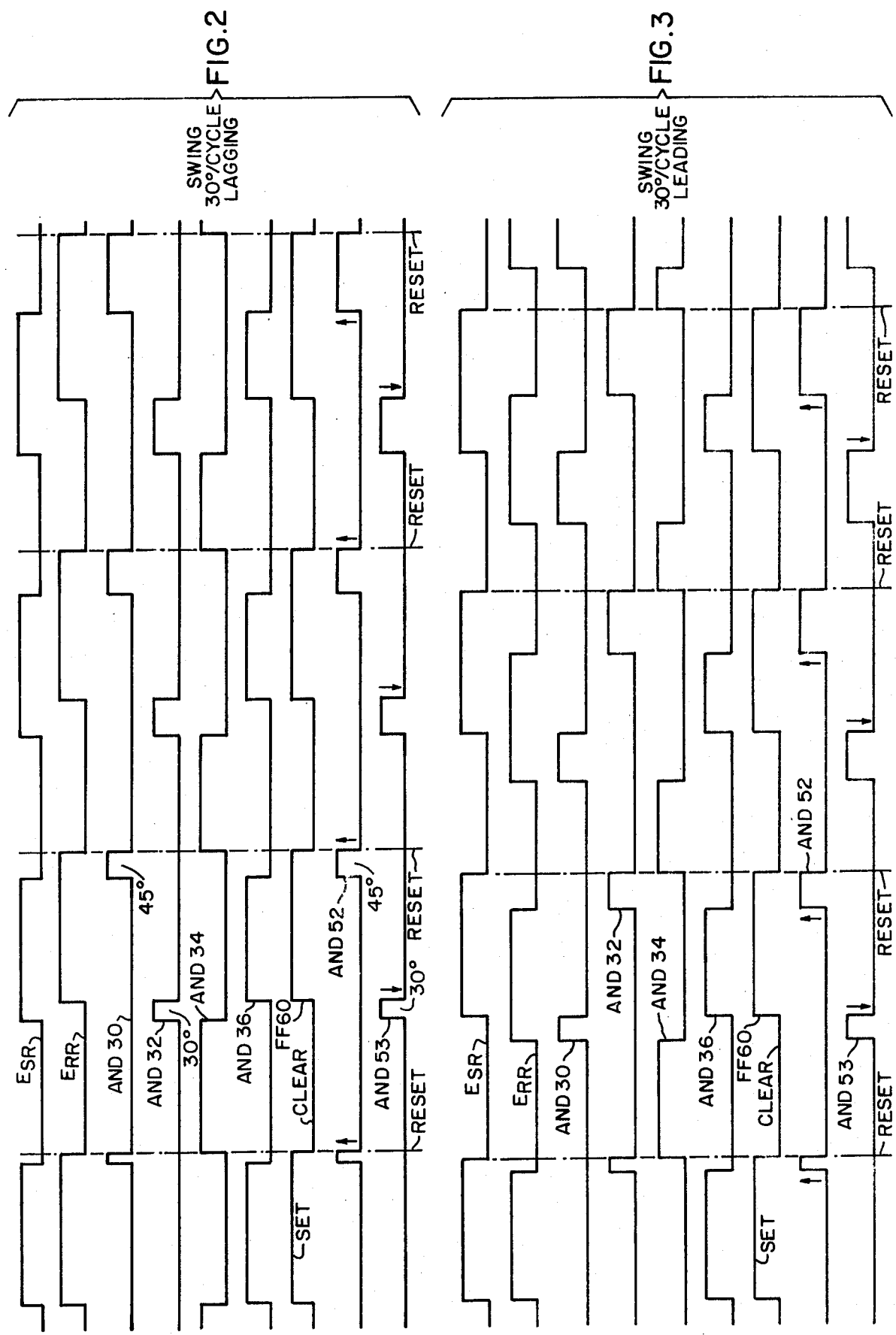

OUT-OF-STEP RELAY

This is a continuation of application Ser. No. 577,515 filed May 14, 1975; and now abandoned.

BACKGROUND OF THE INVENTION

The stability of a transmission network supplied with energy from a number of different energy sources is dependent, at least in part, on the phase difference of the voltages at each end of the transmission line and on the rate of change of the phase difference. In accordance with the prior art, this out-of-step condition was relayed by apparatus primarily designed for fault protection which measured the apparent impedance of the line. In the prior art, a first fault detecting impedance relay having a desired distance characteristic depending upon the line impedance to the balance point was used for fault protection.

Additionally, for out-of-step protection, a second impedance relay having a distance characteristic which over-reached the balance point of the first relay and a timing device were added. In the case of a voltage frequency swing, the locus of the apparent impedance of the line would cross the characteristic impedance line of the second relay. If the swing were great enough, the locus would cross the characteristic impedance line of the first or fault detecting relay within a predetermined time interval as determined by the timer. When this occurred, the line connecting breaker would be actuated to disconnect the line from its power supplying bus.

If there were really an unstable condition, this disconnection would be desirable. However, in many instances this swing would not represent an unstable condition, and if the breaker was not tripped, the locus of the apparent impedance would pass outwardly through the impedance characteristics of the relays and the system would function normally. Under these conditions, the prior art system would result in an undesirable tripping of the breaker.

In accordance with this invention, the operation of an out-of-step relay is based entirely on the swing conditions and is not responsive to any fault or load conditions of the line. This is accomplished by providing first and second input signals; the length of which depend upon the phase relationship of the local and remote voltages. The difference in time length of these two signals is a measure of the rate-of-change of frequency or phase, while the sum of the two signals is a measure of the average phase difference between the local and remote voltages and the time length of the last of these two signals is a measure of the phase difference at the end of the cycle.

BRIEF DESCRIPTION OF THE DRAWINGS

FIG. 2 illustrates certain of the operational relationships which occur when the out-of-step swing is in a lagging direction; and, FIG. 3 illustrates the same operating relationships shown in FIG. 2, when the out-of-step swing is in a leading direction.

DESCRIPTION OF THE PREFERRED EMBODIMENT

Figure 1:
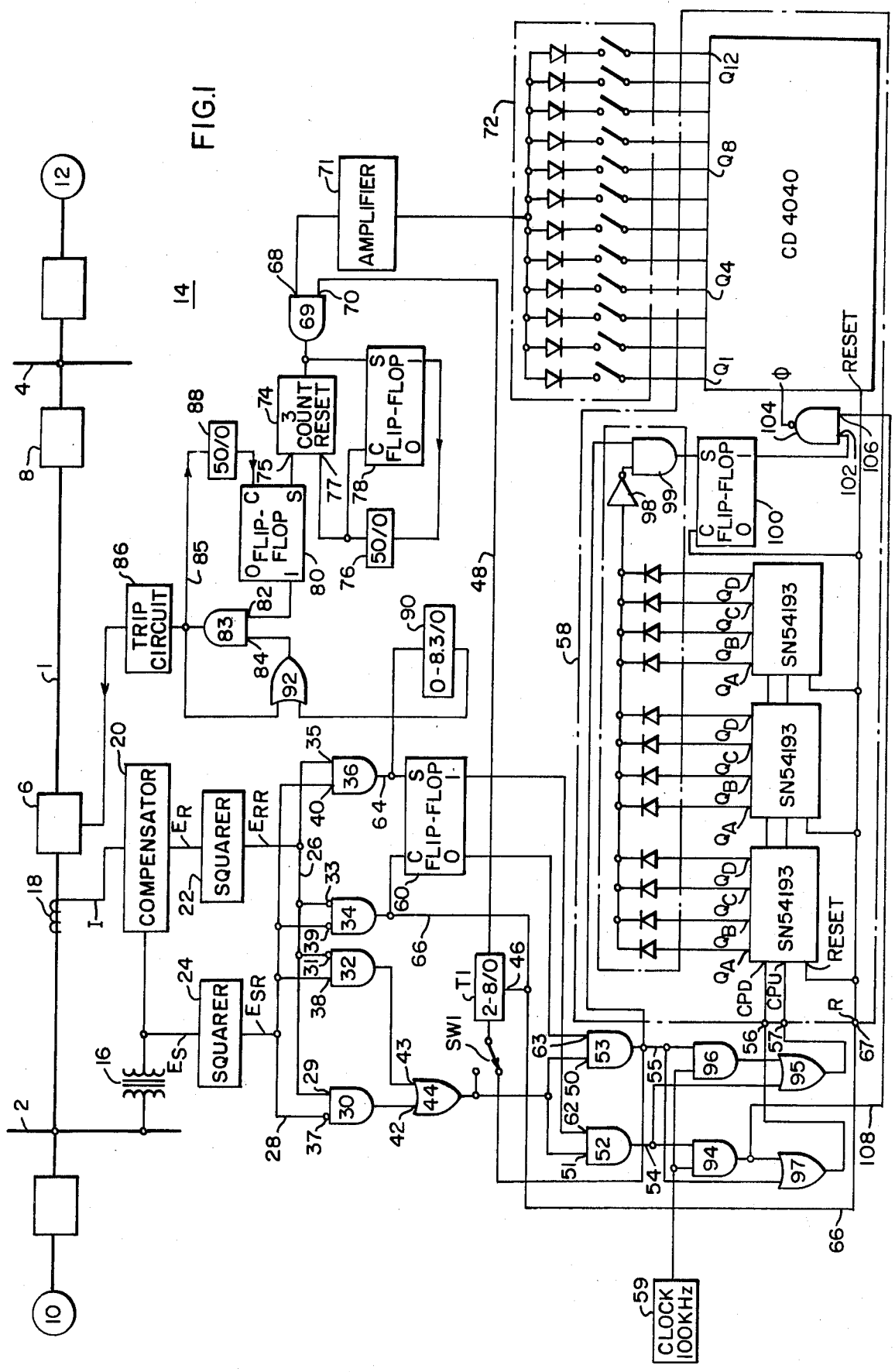
FIG. 1 is a block diagram of an out-of-step relay embodying the invention.

Referring to the drawing by characters of reference, the numeral 1 represents an electrical energy transmission line which connects a local bus 2 with a remote bus 4, through circuit breakers 6 and 8. The bus 2 is supplied with energy from a source 10 while the bus 4 is supplied from a source 12. The transmission line 1, as well as the busses 2 and 4, are shown diagrammatically in single line form, but since such transmission lines are commonly energized with three phase power, transmission line 1 will usually consist of three separate conducting members phased 120° apart with respect to each other, as is well known to those skilled in the art.

Since an out-of-step swing condition is always a balanced condition, it may be detected from a single conductor of the three phase supply. A single out-of-step relay generally designated 14, (shown in single line form) is supplied with a first input quantity $E_S$ proportional to the local bus voltage through a potential transformer 16 and a second input quantity I proportional to the current in a single one of the conductors of the transmission line 1 through a current transformer 18.

The magnitude and phase of the voltage at the bus 4 relative to that at the bus 2 may be determined in any desired manner. A preferred way is by the use of a compensator 20 of the type commonly used with impedance relays. The compensator 20 includes an impedance device (not shown) through which the current I flows. The impedance of the impedance device is arranged to be equal to the impedance of the line 1, and therefore, the voltage quantity $E_R$ established by the impedance device due to the current I will be equal to the voltage differential which exists between the busses 2 and 4. If the voltage established by the impedance device is combined with the voltage $E_S$, it will add or subtract, depending upon the condition of power flow through the line 1. The output voltage $E_R$ thereof will be equal in magnitude and phase with the voltage at the bus 4.

The alternating voltages $E_R$ and $E_S$ are clipped or squared by the squares 22 and 24 and supply substantially square waves $E_{RR}$ and $E_{SR}$ (See FIGS. 2 and 3) to the busses 26 and 28, respectively. During one half cycle of the alternating quantities $E_R$ and $E_S$, the respective busses 26 and 28 will be energized with logical 1 signals and during the other half cycle of the quantities $E_R$ and $E_S$, the respective busses 26 and 28 will be energized with logical 0 signals. It will be appreciated that either negative or positive logic may be used.

The output bus 26 of the squarer 22 is connected to a normal input terminal 29 of an AND network 30, a NOT input terminal 31 of an AND network 32, a NOT input terminal 33 of an AND network 34, and a normal input terminal 35 of an AND network 36. Similarly, the output bus 28 of the squarer 24 is connected to a NOT input terminal 37 of the AND network 30, a normal input terminal 38 of the AND network 32, a NOT input terminal 39 of the AND network 34 and a normal input terminal 40 of the AND network 36.

The output terminals of the AND networks 30 and 32 are connected individually to a pair of input terminals 42 and 43 of an OR network 44 and supply thereto logical signals as indicated in FIGS. 2 and 3 and respectively therein as AND 30 and AND 32. A timer T1 has its input terminal connected through a switch SW1 selectively to the output of the OR network 44 or to the output of AND network 52. When the timer T1 is connected to the OR network 44, it will sum the timing intervals (starting from an initial condition) for which a logical 1 signal is supplied by either of the AND networks 30 and 32 to measure the average of the phase displacement of $E_R$ and $E_S$ over a complete cycle of $E_R$. As will be explained in greater detail below, when the timer T1 is connected to the output of AND network 52, it will measure the phase displacement of $E_R$ and $E_S$ at the end portion of the $E_R$ cycle. Until reset by a reset signal applied to its reset terminal 46, the timer T1 will sum the time intervals of the logical 1 signals supplied thereto. When the sum of these intervals reaches a predetermined minimum magnitude, a logical 1 output signal will appear on its output bus 48.

The logical output signals of the OR network 44 are supplied to normal input terminals 50 and 51 of AND networks 53 and 52 respectively which provide the signals AND 52 and AND 53 as illustrated in FIGS. 2 and 3. The output terminals of the AND networks 52 and 53 are connected by busses 54 and 55, though the AND networks 94 and 96 and the OR networks 97 and 95 respectively, to the up and down input terminals 57 and 56 of a 20 digit binary counter 58. With this arrangement, the counter 58 will count in one sense when a logical 1 signal is supplied by the bus 54 to terminal 56 and in an opposite sense when a logical 1 signal is supplied by the bus 55 to terminal 57. The counting rate is controlled by a clock 59 which may, for example, have a 100 KHz output.

The up-down direction is determined by a flip-flop 60 which provides the output signal FF60 shown in FIGS. 2 and 3. When the flip-flop 60 is in its "set" condition, a logical 1 signal is supplied to the input terminal 62 of the AND network 52, and when it is in its "clear" condition, a logical 1 signal will be supplied to the input terminal 63 of the AND network 53. The "set" terminal S of the flip-flop 60 is connected by a conductor or bus 64 to the output terminal of the AND network 36, and the flip-flop 60 is placed in its "set" condition each time a logical 1 signal is supplied thereto by the conductor 64. Similarly, the clear terminal C is connected to the reset bus 66 which is energized with logical signals as determined by the AND network 34. The reset bus 66 is connected to the reset terminal 46 of the time T1 and the reset terminal 67 of the counter 58. The initial condition to which the counter 58 is reset is preferably to its "all zero" state.

The up count output terminals of the bit counter CD4040 are each connected through individually controlled switches and individual diodes and a power amplifier 71 to one input terminal 68 of an AND network 69 which has its other input terminal 70 connected to the bus 48 to the output terminal of the timer T1. If the up count reaches or exceeds the setting as determined by the setting of the individually controlled switches of the setting network 72, a logical 1 signal will be supplied to the input terminal 68 of the AND network 69.

If a logical 1 signal is supplied concurrently to its input terminal 70, the AND network 69 will supply a logical 1 signal to the 3-count network 74. This network 74 can take many forms. It must be effective to provide a logical 1 output at its output terminal 75 in response to the application of three distinct and separate logical 1 signals thereto from the AND network 69 prior to the timing out of the reset timer 76 which will then apply a logical 1 resetting signal to the reset terminal 77 of the 3-count network 74.

When the first logical 1 signal of a sequence is supplied to the 3-count network 74, a logical 1 signal is also supplied to the "set" input terminal S of a flip-flop 78. This causes the flip-flop 78 to supply a logical 1 signal to the timer 76 which begins to time out its timing interval, which in the instant case, is indicated as being 50 m.s. The output of the timer 76 is connected to the reset terminal 77 of the 3-count network 74 and to the clear terminal C of the flip-flop 78. If three logical 1 signals are supplied to the 3-count network 74 prior to the timing out of the timer 76, a logical 1 signal will be supplied to the set terminal S of the flip-flop 80, which thereupon flips to supply a logical 1 input signal to the terminal 82 of an AND network 83. If the timer 76 times out prior to the supplying of the three logical 1 signals to the 3-count network 74, the resulting logical 1 output signal of the timer 76 resets the 3-count network 74 and a full three subsequent logical 1 signals are again required for it to provide a logical 1 to the flip-flop 80. The timer 76 also provides a logical 1 signal to the "clear" terminal C of the flip-flop 78, which then is set into its clear condition to remove the logical 1 signal from the timer 76 which thereupon resets to its initial condition, without intentional delay, in readiness for a subsequent timing operation.

When the flip-flop 80 is placed in its "set" condition, it supplies a logical 1 signal to one input terminal 82 of an AND network 83. If, at this time, the second input terminal 84 thereof is also receiving a logical 1 signal, output bus 85 of the AND network 83 will supply an energizing signal to the trip circuit 86 so that the breaker 6 (through coventional circuitry not shown) will be caused to trip and disconnect the line 1 from the bus 2. The output bus 85 is also connected to a 50/0 timer 88 which, at the end of its 50 m.s. timing interval, will supply a logical 1 signal to the "clear" terminal C of the flip-flop 80, which then resets to its "clear" condition and removes the energizing signal to the trip circuit 86.

The AND network 83 may be omitted so that the flipping of the flip-flop 80 into its "set" condition results in the energization of the trip circuit 86. When the AND network 83 is used, the trip circuit 86 is held against energization until the AND network 36 supplies its logical 1 output signal and the timer 90 times out. The timer 90 may be adjusted to provide a time delay of from 0–8.3 ms to allow a more favorable phase angle between the voltages $E_S$ and $E_R$ to minimize the stress of interruption experienced by the breaker 6. An OR network 92 is used in the circuit between the timer 90 and the terminal 84. It has its second input connected to the output terminal of the AND network 83. This assures that once the AND network 83 supplies its logical 1 output, due to the timing out of the timer 90, if the flip-flop 80 is in its "set" condition, the AND Network 83 will continue to supply its logical 1 signal until the timer 88 times out.

The up-down counter 58 may take any desired form in which the excess counts caused by the greater time interval that a logical 1 signal is supplied by the AND network 52 with respect to the time interval that a logical 1 signal is supplied by the AND network 53 are counted. As will be explained in detail below, the time interval that the AND network 52 supplies its logical 1 signal is never legs than and, during "swing" conditions, will always exceed the time interval that the AND network 53 supplies its logical 1 signal. A suitable counter 58 may comprise 3 up-down 4 bit counters such as those sold by Texas Instruments under the type designations SN54193 or sold by Fairchild under the type designation 9366. The three up-down counters are connected in series to provide a 12 bit binary counter. The 11th and 12th bits of these counters are unnecessary bits, but are shown since the standard unit is a 4 bit unit. Also, the number of desired bits would be different if a clock of greater frequency was used. What is required is a binary bit counter which will not "overflow" when driven for 180° of the Hertz of the voltage $E_R$, which, in the case of a 60 Hz frequency, would be 8.33 m.s.

The up-down counters SN54193 each have an up-count input terminal CPU, a down-count input terminal CPD, a reset terminal R and four output terminals $Q_A$, $Q_B$, $Q_C$, and $Q_D$. To insure that the up-count and the down-count input terminals CPU and CPD are not concurrently energized with logical 1 signals, the clock counts and the down logical signal are supplied from the clock 59 and from the AND network 52 through an AND network 94 and an OR network 97. Similarly, the clock counts and the up logical signal are supplied from the clock 59 and from the AND network 53 through an AND network 96 and an OR network 95.

In the specific arrangement illustrated, the SN54193 counters first count "up" under the control of the AND network 53 and then count "down" under the control of the AND network 52. This is, of course, an optional arrangement. All that is required is for the SN54193 counters to count in one sense for the entire interval that the AND network 53 provides a logical 1 output signal and to count in the other sense for that portion of the interval that the AND network 52 provides its logical 1 signal until the SN54193 counters return to their initial or reset condition in which all of their logical output signals are 0.

When the SN54193 counters all return to their reset or initial condition, a logical 1 signal will be supplied by the NOT network 98 to the AND network 99. If the AND network 52 is still supplying a logical 1 signal to the AND network 94, the AND network 99 will supply a logical 1 signal to the S terminal of the flip-flop 100 whereby its output terminal will apply a logical 1 signal to terminal 102 of a NAND network 104. When the other terminal 106 receives concurrent clocking pulses from the AND network 94 over the conductor 108, the counter CD4040 will start counting.

The switching or decoding network 72 is set such that when the desired count is obtained by the counter CD4040, a logical 1 signal will be applied through the amplifier 71 to the input terminal 68 of the AND network 69. If the timer T1 has timed out and is supplying a logical 1 signal to the terminal 70, a logical 1 signal will be supplied to the 3-count network 74 and to the flip-flop 78 which flips to start the timing out of the timer 76.

The counters SN54193 and CD4040 are reset respectively to their initial condition each cycle of the lagging one of the voltages $E_R$ and $E_S$ by a logical 1 signal from the AND network 34. This immediately follows the interval that the AND network 52 provided its logical 1 output signal as shown in FIGS. 2 and 3. If three such logical 1 signals are supplied by the counter CD4040 to the 3-count network 74 within the 50 m.s. timing interval of the timer 76, the 3-count network 74 will supply a logical 1 signal to terminal S of the flip-flop 80, causing a logical 1 signal to be supplied therefrom to the terminal 82 of the AND network 83. This logical 1 signal will remain until the timer 90 times out and provides a logical 1 signal to the terminal 84, at which time the AND network 83 will cause the trip circuit 86 to be actuated to trip the breaker 6.

The more detailed operation of the relay 14 may be best understood by referring to FIGS. 2 and 3 which illustrate the timing functions of the relay with a 30° swing rate per cycle in the lagging and leading directions (based on the remote voltage relative to the local voltage) starting from a 0° phase angle at the 0° point in the voltage $E_S$ and $E_{SR}$. It will be appreciated that for a lagging phase relationship, the AND network 32 provides an output signal AND 32 having a logical 1 output signal once each cycle for a duration equal to the magnitude of the phase displacement of the remote voltage $E_R$ at the zero degree point in the cycle of the local and remote voltages $E_S$ and $E_R$ and of their squared forms $E_{SR}$ and $E_{RR}$. The AND network 30 will provide an output signal AND 30 having a logical 1 output signal AND 30 once each cycle for a duration equal to the magnitude of the phase displacement of the remote voltage at the zero degree point in the cycle of the local and remote voltages $E_S$ and $E_R$, plus one half of the swing rate in degrees per cycle.

The curve AND 34 represents the output of the AND network 34 and has a logical 1 output during the interval when both of the curves $E_{SR}$ and $E_{RR}$ are in their logical 0 conditions. A logical 1 condition of AND 34 supplies a logical 1 signal to the reset bus 66, a "clear" signal to the flip-flop 60 and a reset signal to reset all of the individual counters SN54193 and counter CD4040 to their 0 output conditions.

The output curve AND 53 of the AND network 53 will supply a logical 1 output signal during the interval that AND 32 supplies its logical 1 output signal. This is supplied by the conductor or bus 55 to the "count-up" input terminal 57. As long as this logical 1 signal exists, the counters SN54193 will count up at a rate determined by the clock 59, starting from the 0 output of the counter segments SN54193 to which it is reset each cycle by the AND network 34. Once each cycle of the voltages $E_{SR}$ and $E_{RR}$ and when they are both of a logical 1 magnitude, the output signal AND 36 of the AND network 36 provides a logical 1 output. This logical 1 portion of the curve AND 36 is supplied to the "set" terminal S of the flip-flop 60 which thereupon flips to terminate the logical 1 signal to the AND network 53 and to supply a logical 1 signal to the input terminal 62 of the AND network 52. Thereafter, when a logical 1 signal is supplied to the output bus 45 of the OR network 44, the AND network 52 will supply a logical 1 signal to the "count-down" input terminal 56 of the counter 58 and the counters SN54193 will "count-down". Since the AND 52 signal is supplied when the flip-flop 60 is in its set condition, and assuming that the length of the logical 1 portion of the curve AND 52 is greater than the logical 1 portion of the curve AND 53, the counter segments SN54193 will return to their 0 logical output condition. When this occurs, the timing is transferred from the counters SN54193 to the counter CD4040 as discussed above.

It will now become apparent that with a 30° swing per cycle in a lagging direction, the net count will be of a magnitude equal to one half the swing rate, or in this case, 15° based on a 60 Hz rate. The switch 72 may be set as desired so that a logical 1 signal is supplied to the terminal 68 only when the swing rate is equal to or exceeds a predetermined minimum acceptable rate.

The timer T1 sums each cycle, either the total time intervals of the logical 1 signals of the AND 30 and AND 32 signals, or only the time interval of the logical 1 signal of the AND 30 signal, depending upon the position of the switch SW1.

In FIG. 2, the length of the logical 1 portion of the curve AND 32 represents the sum of the lagging phase displacement angle between $E_S$ and $E_R$ near the 0° point of the wave $E_{RR}$ while the logical 1 portion of the curve AND 30 represents the sum of this lagging phase angle plus one half of the "swing" rate near the 180° point of the wave $E_{RR}$. The total time of these logical 1 signals of the AND 30 and AND 32 signals is a measure of the magnitude of the average value of the lagging phase displacement of voltage $E_R$ with respect to the voltage $E_S$. The timer T1 is set to time out only after the phase difference between $E_R$ and $E_S$ equals or exceeds a desired minimum magnitude.

FIG. 3 illustrates the relationships of the quantities $E_{SR}$, $E_{RR}$, AND 30, AND 32, AND 34, AND 36, AND 52, AND 53 and the output FF60 of flip-flop 60 with a swing rate of 30° per cycle in a leading direction of $E_R$. By inspection, it will be appreciated that the output signal FF60 of the flip-flop 60 is reversedly arranged whereby the "up" signal AND 52 and the down signal AND 53 are reversedly arranged with respect to the AND 30 and AND 32 signals from that of FIG. 2. It should further be noted that the duration of the "up" count signal will exceed the duration of the "down" count signal as a function of the "swing" rate and the setting of the switch SW1 will again determine the minimum swing rate which must be equalled or exceeded to supply the logical 1 signal to the terminal 68 of the AND network 69.

The sum of the logical 1 intervals of the AND 30 and AND 32 signals is again a measure of the magnitude of the leading phase angle of the voltage $E_R$ with respect to the voltage $E_S$ and the setting of the timer T1 determines the minimum phase angle which must be equalled or exceeded for a logical 1 signal to be supplied to the input terminal 70 of the AND network 69.

What is claimed and is desired to be secured by United States Letters Patent is as follows:

1. An out-of-step relay for an alternating potential power system comprising, first circuit means adapted to be connected to said system and having an output voltage quantity proportional to the phase of the voltage of said system at a first location, second circuit means adapted to be connected to said system and having an output voltage quantity proportional to the phase of the voltage of said system at a second location remote from said first location, a plurality of phase comparing networks, each of said networks having first and second input circuits and an output circuit, third circuit means individually connecting said first and second input circuits of a first of said comparing networks to said first and second circuit means respectively, fourth circuit means individually connecting said first and second input circuits of a second of said comparing networks to said first and second circuit means respectively, said first comparing network being effective to provide a logical 1 output signal at a first relative polarity of said voltage quantities, said second network being effective to provide a logical 1 output signal at a second relative polarity of said voltage quantities, a time integrating device effective to integrate first and second input signals supplied thereto and having input means and an output means, fifth circuit means connecting said input means of said integrating device to said output circuits of said first and second comparing networks, said fifth circuit means being effective to supply said first and second input signals to said integrating device in accordance with the logical output signals of said first and second comparing networks, said integrating device being effective to integrate said first and second input signals supplied thereto in opposite senses and having an initial condition, sixth circuit means connected to said output means of said integrating device, said integrating device being effective to supply a logical signal to said first circuit means when the magnitude of the differences of said integrated values of said first and second signals is greater than a predetermined minimum magnitude and of a determined sense, and seventh circuit means effective to reset said integrating device to its said initial condition subsequent to its integration of one of said input signals followed by its integration of the other of said input signals.

2. The relay of claim 1 in which said comparing networks are AND networks, said first input circuit of said first AND network and said second input circuit of said second AND network being NOT inputs whereby said first and second AND networks provide logic output signals of a predetermined sense when the polarities of said output voltage quantities is opposite.

3. The relay of claim 1 including a first timing device having an input circuit connected to be energized by logic signals from one of said first and second comparing networks, said first timing device having an output circuit, an AND device having first and second input circuits and an output circuit, said first and second input circuits of said AND device being individually connected to and energized from said fifth circuit means and from said output circuit of said timing device, said AND device being arranged to provide a breaker tripping signal when both of its said input circuits receive logic signals of an appropriate sense.

4. The relay of claim 3 in which said input circuit of said timing device is connected to be energized by logic signals of an appropriate sense from both of said first and said second comparing networks and is arranged to sum the time of said energizing logic outputs of said first and second comparing networks, said timing device being provided with a resetting circuit actuated by said seventh circuit means, said second resetting circuit when actuated being effective to reset said timing device to an initial condition.

5. An out-of-step relay for an alternating potential power system comprising, first circuit means adapted to be connected to said system and having a first output quantity representing the phase of the voltage of said system at a first location, second circuit means adapted to be connected to said system and having a second output quantity representing the phase of the voltage of said system at a second location, said second location being remote from said first location, a summing device, said device being effective to sum a first input quantity in a first direction and to sum a second input quantity in a second direction whereby said device provides an output signal which is representative of the difference between said input quantities, said summing device including a resetting circuit which causes said device to provide an initial output signal of reset magnitude, third circuit means operatively connected to said first and second circuit means and having a first logical output signal in response to a first relationship of said output quantities, fourth circuit means operatively connected to said first and second circuit means and having a first logical output signal in response to a second relationship of said output quantities, fifth circuit means connecting said third and fourth circuit means to said summing device to supply said first and second input quantities thereto as derived from said first logical output signals of said third and fourth circuit means, said fourth circuit means including a phase sensing device effective to determine a first condition in which said third circuit means supplies said first input quantity and said third circuit means supplies said second quantity, said phase sensing device further being effective to determine a second condition in which said third circuit means supplies said second input quantity and said third circuit means supplies said first input quantity, sixth circuit means operatively connecting said phase sensing device to said first and second circuit means, said phase sensing device being effective to respond to said conditions of said phase sensing device in accordance with the relative phase conditions of the voltages in said system at said locations, and seventh circuit means actuated by said system and connected to said resetting circuit to reset said summing device as a function of the frequency of the system voltage.

6. The relay of claim 5 which includes a first trip conditioning circuit operatively connected to said summing device and effective at predetermined characteristics of said output signal of said summing device to provide a logic output signal.

7. The relay of claim 6 which includes a timing device, an AND network, said timing device being effective wherever an appropriate logic signal is supplied thereto sum the time intervals of said logic signals and to provide appropriate logic output signals when the sum of said time intervals reaches a predetermined minimum time interval, said timing device including a resetting circuit effective when energized with a logic signal to reset to a reset condition, eighth circuit means operatively connecting said timing device to said first and second circuit means whereby said timing device sums said first and second output quantities thereof, ninth circuit means actuated by said system and connected to said resetting circuit of timing device to reset said timing device as a function of the frequency of the system voltage, said AND network having a first input energized by said output signal of said summing device and a second input energized by said output signal of said timing device, and a breaker tripping circuit energized by said last-named AND network.

8. An out-of-step relay for an alternating potential power transmission line extending between a local and a remote location, said relay comprising, a first pair of input terminals adapted to be energized by said line to provide an alternating voltage output quantity proportional to the voltage of said line at said local location, a second pair of input terminals adapted to be energized by said line to provide an alternating current output quantity proportional to the current in said line at said local location, a compensating network having a voltage input circuit operatively connected to said first pair of input terminals and a current input circuit operatively connected to said second pair of input terminals, said compensating network including an impedance network energized by said current input, said compensating network having an output circuit energized with an alternating output quantity proportional to the difference in magnitude of said output quantity derived from said first pair of input terminals and an alternating voltage quantity generated by the flow of said current output quantity through said impedance network, first and second AND networks, each of said AND networks having a normal input terminal and a NOT input terminal and an output terminal, first circuit means connecting said normal terminal of said first AND network and said NOT terminal of said second AND network to said output circuit of said compensating network, said first circuit means being effective to supply logical 1 signals during one half cycle and logical 0 signals during the other half cycle of said alternating quantities of said output circuit of said compensating network, second circuit means operatively connecting said NOT terminal of first AND network and said normal terminal of said second AND network to said first pair of input terminals, said second circuit means being effective to supply logical 1 signals during said one half cycle of said voltage output quantity and logical 0 signals during said other half cycle of said alternating voltage output quantity derived from said first pair of input terminals, a first timing device having a first input circuit and a second input circuit and adapted to time intervals in a first sense when one of its said input circuits is energized and to time intervals in a second sense when the other of its said input circuits is energized, said second sense being opposite to said first sense, said timing device having a reset circuit adapted when energized to reset said timing device to an initial condition, third circuit means connecting said output terminals said first and second AND networks to said input circuits of said timing device for energization of said first and second input circuits of said timing device as a function of the energization of said output circuits of said AND networks, said timing device having an output circuit energized as a consequence of the occurrence of a timed interval of a predetermined minimum time magnitude in one of said senses from said initial condition, and fourth circuit means operatively connecting said reset circuit of said timing device to at least one of said first and second pairs of input terminals whereby said fourth circuit means is effective to periodically reset said timing device as a function of said output quantity of one of said quantities derived from said first pair of input terminals and said output quantity of said compensating network.

9. The relay of claim 8 including a second timing device, said second timing device having an input circuit operable when energized to cause said second timing device to time intervals in a first sense when supplied with a logical 1 signal, said second timing device having an output energized with a logical 1 signal when the sum of said time intervals during which said logical 1 signal supplied thereto exceeds a predetermined minimum time period, said second timing device having reset circuit adapted when energized to reset said second timing device to an initial condition, fifth circuit means connecting said input circuit of said second timing device to said output circuits of said AND networks whereby the logical 1 output signals thereof will cause said second timing device to time the total time intervals of said logical 1 signals, means connecting said reset circuit of said second timing device to said fourth circuit means whereby said first and second timing devices are reset substantially concurrently, and a third AND network having a first input circuit operatively connected to said output of said output circuit of said first timing device and a second input circuit operatively connected to said output circuit of said second timing device, said third AND network having an output and being effective when logical 1 signals occur at said outputs of both of said timing devices to produce a logical 1 signal at its said output.

10. The relay of claim 9 including a counting device having an input and an output, said counting device being effective when starting from an initial condition to provide a logical 1 signal at its said output solely subsequent to a predetermined number of logical 1 signals being applied to its said input, a trip circuit connected to said output of said counting device and means connecting said input of said counting device to said output of said third AND network.

11. The relay of claim 10 in which said counting device has a second output energized by the first occurrence of a logical 1 signal at its said input and a reset input adapted when supplied with a logical 1 signal to reset said counting device to its said initial condition, and a third timing device connected between said second output and said reset input of said counting device, said third timing device being effective when energized with a logical 1 signal from said counting device to time out a predetermined time interval, said third timing device being effective subsequent to the timing out of its said time interval to energize said reset input of said counting device with a logical 1 signal.

12. The relay of claim 9 in which said fourth circuit means includes a third AND network having first and second inputs and an output, circuit means operatively connecting said first input of said third AND network to said first pair of input terminals, said last-named circuit means being effective to provide a logical 1 signal thereto at one polarity of said output quantity provided by said first pair of input terminals, and circuit means operatively connecting said second input of said third AND network to said output circuit of said first timing device.

13. A circuit controlling relay for an alternating potential power transmitting system having first and second portions supplied with alternating potential power from first and second power supplies, said relay comprising first and second circuit means energized from said system, said first circuit means providing a first pulsating control quantity which pulsates in accordance with the phase of the voltage at said first portion, said second means providing a second pulsating control quantity which pulsates in accordance with the phase of the voltage at said second portion, a phase comparing network energized by said control quantities and effective at first and second spaced portions of one of said pulsating control quantities to determine the phase displacement of the other of said pulsating control quantities with respect to said one control quantity at each of its said spaced portions, a phase-displacement sensing circuit effective to determine the magnitude of the phase displacement of said control quantities at first and second portions of the cycle of the voltage wave of one of said voltages, and output circuit means actuated by said sensing circuit solely when the difference in magnitude of the phase displacement between said first and second portions is within a predetermined range of magnitudes.

14. The relay of claim 13 including a second phase-displacement sensing circuit effective to determine the magnitude of the phase displacement of said control quantities at one of said first and second portions of the voltage wave of said one voltage, said output circuit means being actuated by both of said sensing circuits solely when the difference in magnitude of the phase displacement between said first and second portions as measured by said first sensing circuit is within a first predetermined range of magnitudes and when the magnitude of the phase displacement of said control quantities at said one portion is within a second predetermined range of magnitudes.

15. An out-of-step relay for an alternating potential power transmitting system having local and remote portions supplied with alternating potential power from local and remote power supplies, said relay comprising first and second circuit means energized from said system, said first circuit means providing an essentially square wave control quantity which is phased in accordance with the phase of the voltage at said local portion, said second means providing a second essentially square wave control quantity which is phased in accordance with the phase of the voltage at said remote portion, first and second phase comparing network energized by said control quantities and effective at first and second spaced portions of one of said control quantities to determine the phase displacement of the other of said control quantities with respect to said one control quantity at each of its said spaced portions, and a phase-displacement sensing circuit effective to determine the magnitude of the phase displacement of said control quantities at first and second portions of the cycle of the voltage wave of one of said voltages.

* * * * *